(12) United States Patent
Robertson

(10) Patent No.: US 10,477,884 B2
(45) Date of Patent: Nov. 19, 2019

(54) APPARATUS FOR EGG SEPARATION

(71) Applicant: Bobby Dale Robertson, Duson, LA (US)

(72) Inventor: Bobby Dale Robertson, Duson, LA (US)

(*) Notice: Subject to any disclaimer, the term of this patent is extended or adjusted under 35 U.S.C. 154(b) by 280 days.

(21) Appl. No.: 15/459,689

(22) Filed: Mar. 15, 2017

(65) Prior Publication Data

US 2017/0265506 A1    Sep. 21, 2017

Related U.S. Application Data

(60) Provisional application No. 62/309,141, filed on Mar. 16, 2016.

(51) Int. Cl.
*A23L 15/00*    (2016.01)
*A47J 43/14*    (2006.01)

(52) U.S. Cl.
CPC ............... *A23L 15/00* (2016.08); *A47J 43/14* (2013.01); *A23V 2002/00* (2013.01)

(58) Field of Classification Search
CPC .................................. A23L 15/00; A47J 43/14
See application file for complete search history.

(56) References Cited

U.S. PATENT DOCUMENTS

| | | | | |
|---|---|---|---|---|
| 1,729,067 A | * | 9/1929 | Dow ..................... | A47J 43/14 99/497 |
| 3,092,015 A | * | 6/1963 | Tucker ................. | A47J 37/067 99/446 |
| 2008/0047540 A1 | * | 2/2008 | Hoffman ............. | A47J 37/0786 126/25 A |
| 2014/0230666 A1 | * | 8/2014 | Atlaw ................ | A47J 37/0786 99/449 |

FOREIGN PATENT DOCUMENTS

| | | | |
|---|---|---|---|
| DE | 202012103970 | * | 12/2012 |
| FR | 2552991 | * | 4/1995 |
| GB | 770610 | * | 3/1957 |
| JP | 2000300446 | * | 10/2000 |

OTHER PUBLICATIONS

English Translation for FR2552991 published Apr. 1995.*
English Translation for DE202012103970 published Dec. 2012.*

* cited by examiner

*Primary Examiner* — Anthony J Weier
(74) *Attorney, Agent, or Firm* — Ted M. Anthony

(57) ABSTRACT

An egg separating apparatus for use in separating an egg white and an egg yolk when cracking a raw egg. More particularly, a cooking and/or baking apparatus for use in being able to concurrently separate a plurality of egg whites and a plurality of egg yolks at a relatively fast pace, thus saving a user valuable time. More particularly still, a relatively light weight and manageable kitchen apparatus for use in efficiently and effectively separating multiple egg whites and multiple egg yolks at once.

3 Claims, 4 Drawing Sheets

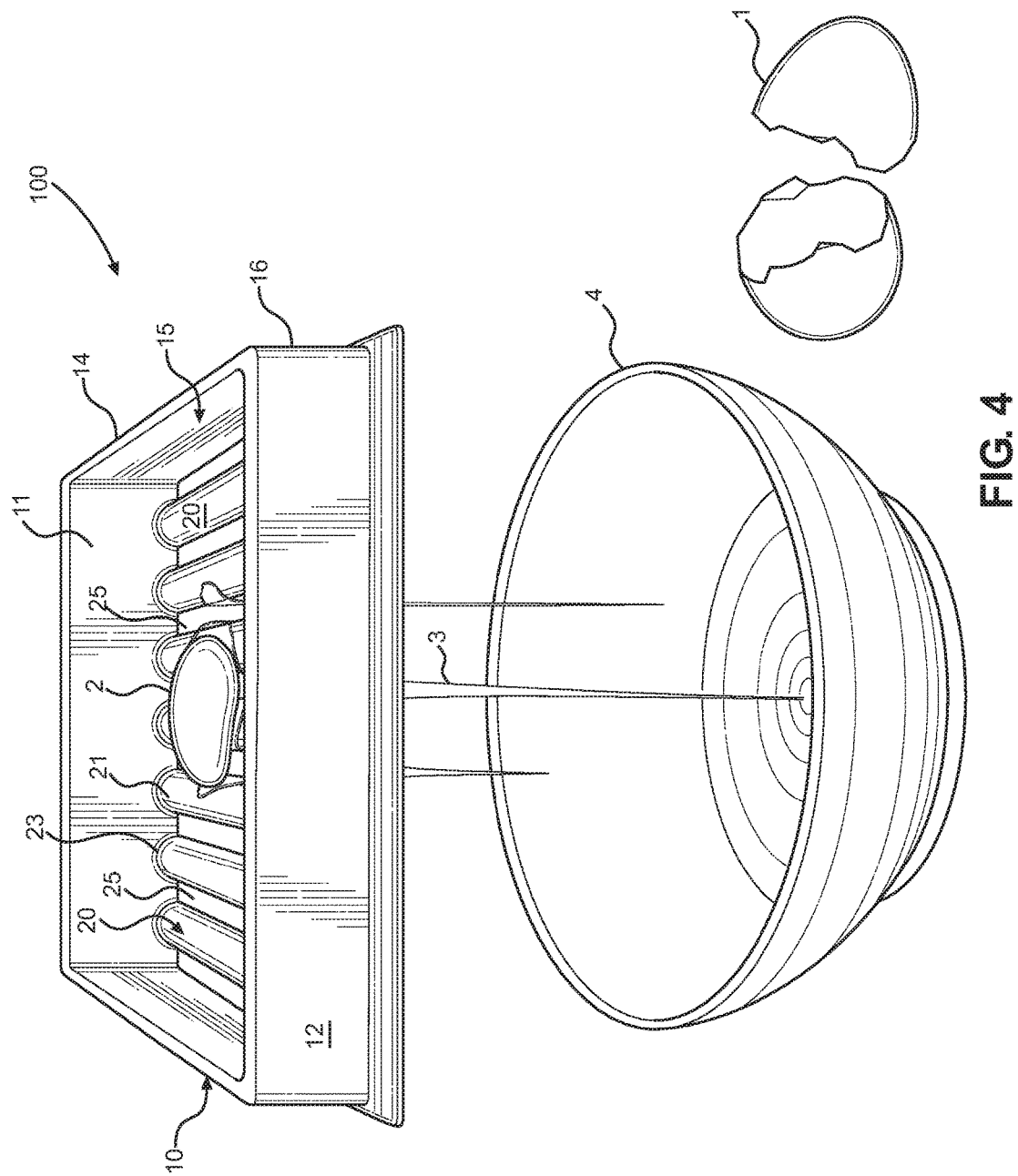

APPARATUS FOR EGG SEPARATION

CROSS REFERENCES TO RELATED APPLICATION

PRIORITY OF U.S. PROVISIONAL PATENT APPLICATION SER. NO. 62/309,141, FILED Mar. 16, 2016, INCORPORATED HEREIN BY REFERENCE, IS HEREBY CLAIMED.

STATEMENTS AS TO THE RIGHTS TO THE INVENTION MADE UNDER FEDERALLY SPONSORED RESEARCH AND DEVELOPMENT

NONE

BACKGROUND OF THE INVENTION

1. Field of the Invention

The present invention pertains to an apparatus for use in separating an egg white and an egg yolk when cracking a raw egg. More particularly, the present invention pertains to a cooking and/or baking apparatus for use in being able to concurrently separate a plurality of egg whites and a plurality of egg yolks at a relatively fast pace, thus saving a user valuable time. More particularly still, the present invention pertains to a relatively light weight kitchen apparatus for use in efficiently and effectively separating multiple egg whites and multiple egg yolks simultaneously.

2. Brief Description of the Prior Art

The structure of an egg generally comprises three main parts: a shell, an egg yolk, and an egg white. The eggshell is the sturdy protection of the fragile internal egg components, and is typically the leftover waste after using an egg. For the function of the egg, however, the shell is vital. It gives physical strength due to its hard calcified structure, protects from dirt and bacteria entering into the egg, prevents the egg from drying out, and serves as a calcium source for a potentially developing chick. Bumpy and grainy in texture, an eggshell is covered with as many as 17,000 tiny pores, which ensure that oxygen can penetrate and that carbon dioxide ($CO_2$) and other gases can escape. Thus, the shell is a semipermeable membrane, which means that air and moisture can pass through its pores. Further, the shell represents about 10% of the weight of an egg and is made almost entirely of calcium carbonate ($CaCO_3$) crystals. The shell thickness and thus the strength generally depends on egg size, breed, the age of the hen, and feed composition.

The yolk generally comprises substantially less water and substantially more protein than the white, some fat, and most of the vitamins and minerals of the egg. These typically include iron, vitamin A, vitamin D, phosphorus, calcium, thiamine, and riboflavin. The yolk represents approximately twenty-eight percent (28%) of the weight of the egg and comprises approximately ⅔ fat and approximately ⅓ protein. The fat content consists primarily of triglycerides, cholesterol, and the phospholipid lecithin, which is an effective emulsifier. The amount of fat and cholesterol and the composition of the fat is influenced by the diet of the hen. Further, yolk color can range from just a hint of yellow to a deep orange, according to the feed and breed of the hen. Additionally, the yolk is enclosed by a relatively clear casing, known as the vitelline membrane, and is held in place by two screw-shaped egg white strands, known as the chalazae.

The egg white is known as the albumen and beneficially prevents external bacteria from penetrating the yolk. The egg white comprises four alternating layers of thick and thin albumen, which contain approximately forty (40) different proteins, the main components of the egg white, in addition to water. The egg white represents approximately sixty percent (60%) of the weight of the egg and comprises approximately eighty-eight percent (88%) water and twelve percent (12%) dry matter, primarily protein. Additionally, the white is divided into three parts: an inner and an outer liquid layer, and in between those, a liquid layer with a substantially thicker consistency.

Separating eggs is a process, generally used in cooking, in which the egg yolk is removed from the egg white. This allows one part of the egg to be used without the other part, or each part to be treated in different ways. All methods for separating eggs make use of the fact that the yolk can hold itself together by way of the vitelline membrane, while the white is typically more viscous and runnier, and thus, more difficult to keep intact. As a result, the egg white is easily separable from the egg yolk.

Conventional egg separating techniques are generally used in order to separate one egg at a time, thus resulting in a relatively time-consuming process, especially if a user has to separate a large number of eggs for any particular reason, such as, for example, for a particular cooking or baking recipe. For example, a conventional method of egg separating can include a user cracking an egg and then pouring the contents of the egg, the egg yolk and the egg white, over his or her free hand. This method allows the egg whites to fall through the cracks of the user's fingers, while allowing the egg yolk to remain in the user's hand. However, this method is relatively time consuming and also requires the user to wash his or her hands after every egg separation. Additionally, conventional egg separating techniques can also require a steady hand in order to prevent an egg yolk from breaking; however, if such breaking occurs, a user is typically required to start the entire egg separating process over, thereby unnecessarily wasting a number of eggs if at least one egg yolk breaks and combines with the egg whites.

As a result, there is a need for an egg separator that can efficiently and effectively separate multiple eggs at a single time, thus, saving a user time, effort, and cost while cooking and/or baking.

SUMMARY OF THE INVENTION

In a preferred embodiment, the present invention comprises an egg separating apparatus generally comprising a support member and a plurality of inner rod members. Support member comprises a plurality of side members that cooperate to form an inner opening. Side members attachably connect to each other at relatively perpendicular orientations, thereby forming a plurality of corners.

Within said inner opening, said inner rod members are attachably connected to parallel sides of said support member and have a substantially semi-circular configuration, wherein a top surface of said inner rod members is relatively curved, thereby providing a relatively smooth exterior in order to prevent an egg yolk from breaking upon contact with said inner rod members. Further, inner rod members are equidistantly spaced apart from each other, thereby creating a plurality of passages between each inner rod member. Passages between each rod beneficially have a width dimension that is relatively wide enough to allow for an egg white, or multiple egg whites, to pass through said openings, but that is still relatively narrow enough to prevent a whole egg yolk, or multiple egg yolks, from passing through said openings.

In a preferred embodiment, the egg separating apparatus of the present invention comprises a device wherein a user is able to crack at least one egg over said egg separating apparatus, thereby being able to separate an egg white from an egg yolk. Once a user cracks an egg over said egg separating apparatus, an egg yolk and an egg white both land on the top surface of the inner rod members that are located within the support member. The egg white then separates from the egg yolk due to their different biological compositions and properties, thereby allowing the egg white to fall through the passages, or vents, that are located between the inner rod members, and ultimately, allowing the egg white to land within a bowl, or any other similar receiving container, that is positioned underneath the egg separating apparatus of the present invention. Simultaneously, the egg yolk remains positioned on the top surface of the inner rod members, thus being able to be removed by said user. As a result, the egg yolk and the egg white are then fully separated, and ultimately, able to be used, as necessary.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 4 depicts a side view of a preferred embodiment of an egg separating apparatus of the present invention in use.

DETAILED DESCRIPTION OF A PREFERRED EMBODIMENT

Figure 1:
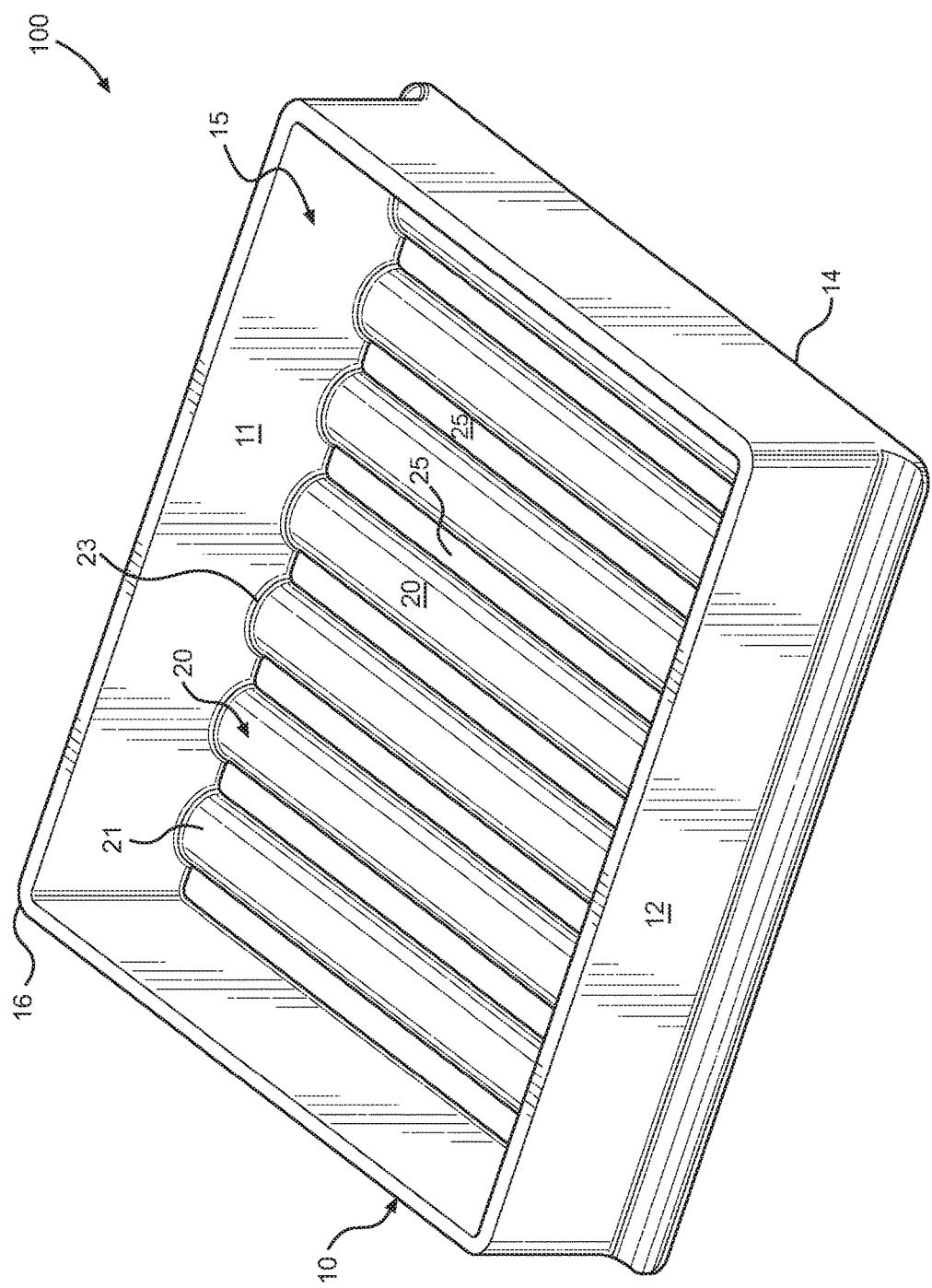
FIG. 1 depicts a front perspective view of a preferred embodiment of an egg separating apparatus of the present invention.

Referring to the drawings, FIG. 1 depicts a perspective view of an egg separating apparatus 100 of the present invention generally comprising support member 10. Egg separating apparatus 100 of the present invention can be manufactured in a variety of different dimensions; in a preferred embodiment, said egg separating apparatus 100 has dimensions that are relatively wide enough to allow a plurality of egg whites to be separated from a plurality of egg yolks, while keeping said egg yolks intact. Further, egg separating apparatus 100 of the present invention can be manufactured from a relatively rigid material, such as, for example, polycarbonate, polyethylene, polypropylene, nylon, stainless steel, or any other substantially solid material exhibiting desired characteristics. In addition, egg separating apparatus 100 can also be manufactured from a relatively smooth material, thus providing a substantially soft, yet durable surface in order to keep an egg yolk from breaking upon contact with egg separating apparatus 100.

Still referring to FIG. 1, egg separating apparatus 100 generally comprises support member 10. Support member 10 comprises a substantially rectangular-shaped frame, wherein frame further comprises a plurality of—typically four (4)—side members 14 that are attachably connected to each other, thereby cooperating to form an inner orifice, or opening 15. When frame is constructed, side members 14 form a plurality of corners 16 at each connection point, wherein corners 16 beneficially have relatively rounded edges, thus creating a relatively smooth surface throughout the entirety of egg separating apparatus 100 of the present invention.

In a preferred embodiment, egg separating apparatus 100 generally comprises a plurality of inner rods 20 that are located within inner opening 15 of support member 10. Rods 20 have a substantially semi-circular configuration with a substantially rounded, or curved, top surface 21, thereby providing a substantially smooth and soft exterior in order to prevent an egg yolk from breaking upon contact with top surface 21. Further, rods 20 attachably connect to the present invention from one side 11 of support member 10 to an opposing parallel side 12 of support member 10 and are equidistantly spaced apart, thereby creating a plurality of openings 25, or passages, between each rod 20. Passages 25 between each rod 20 beneficially have a width dimension that is relatively wide enough to allow for an egg white, or multiple egg whites, to pass through openings 25, but that is still relatively narrow enough to prevent a whole egg yolk, or multiple egg yolks, from passing through openings 25.

Figure 2:
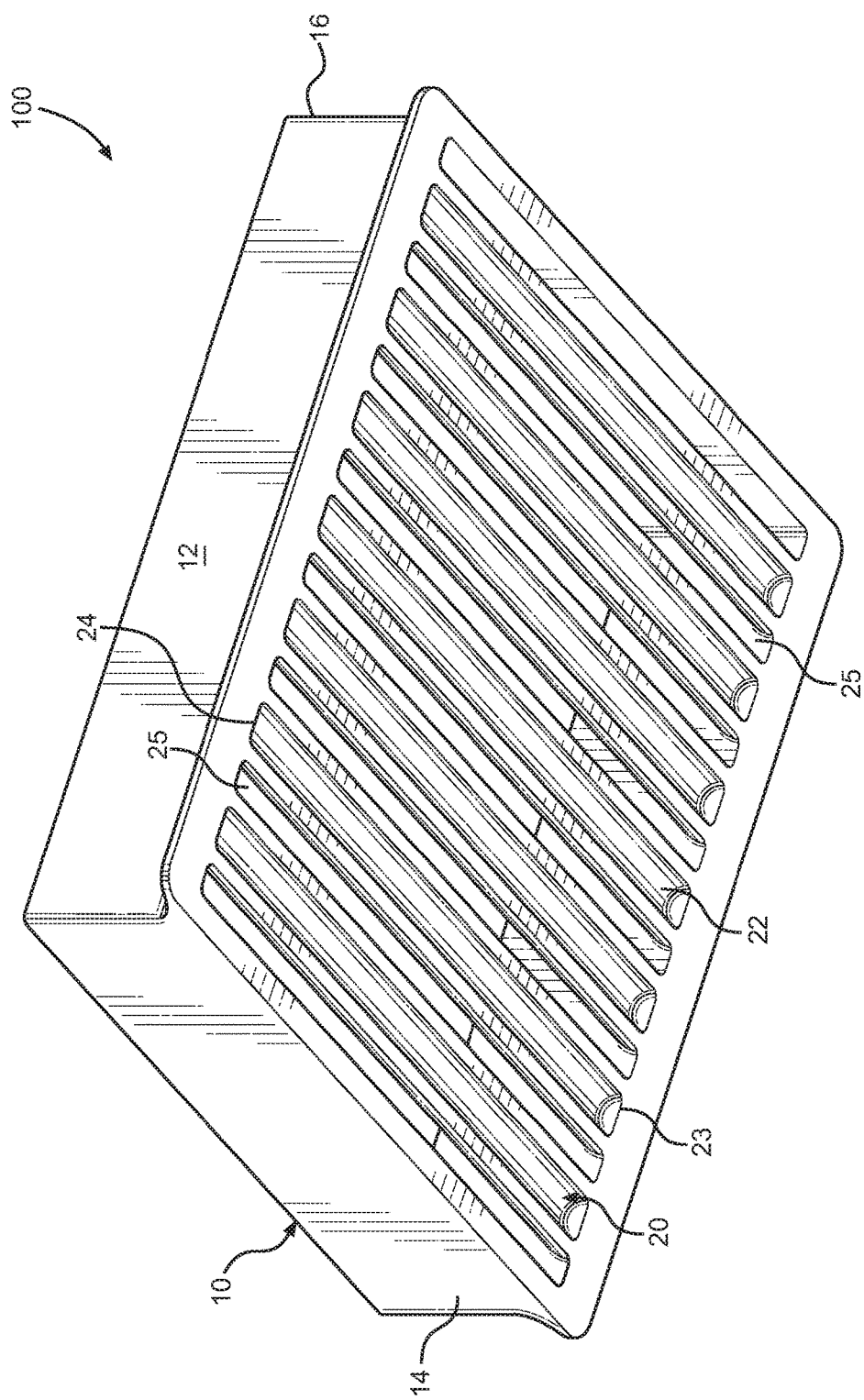
FIG. 2 depicts a bottom perspective view of a preferred embodiment of an egg separating apparatus of the present invention.

FIG. 2 depicts a bottom perspective view of egg separating apparatus 100 generally comprising support member 10 and inner rod members 20. Support member 10 comprises a plurality of sides 14 that are attachably connected in a relatively rectangular configuration, wherein sides 14 cooperate to form inner opening 15. Rod members 20 are located within inner opening 15, wherein a first end 23 of rod member 20 is attachably connected to one side 11 of support member 10, and a second end 24 of rod member 20 is attachably connected to an opposing parallel side 12 of support member 10. Inner rods 20 have a substantially semi-circular configuration with a substantially rounded, or curved, top surface 21, thereby providing a substantially smooth and soft exterior in order to prevent an egg yolk from breaking upon contact with top surface 21. Further, rod members 20 comprise a bottom surface 22 that has a relatively concave formation.

In a preferred embodiment, rod members 20 are aligned in a relatively parallel configuration to each other and are equidistantly spaced apart from one another, thereby forming passages 25 between each rod member 20. Thus, when a user cracks an egg above egg separating apparatus 100 onto top surface 21 of inner rod member 20, passages 25 allow at least one egg white to separate from at least one egg yolk, and thus fall between inner rod members 20, and ultimately, into a receiving container, or bowl-like apparatus. As a result, egg yolk is left remaining on top surface 21 of inner rod member 20, in a fully intact configuration.

Figure 3:
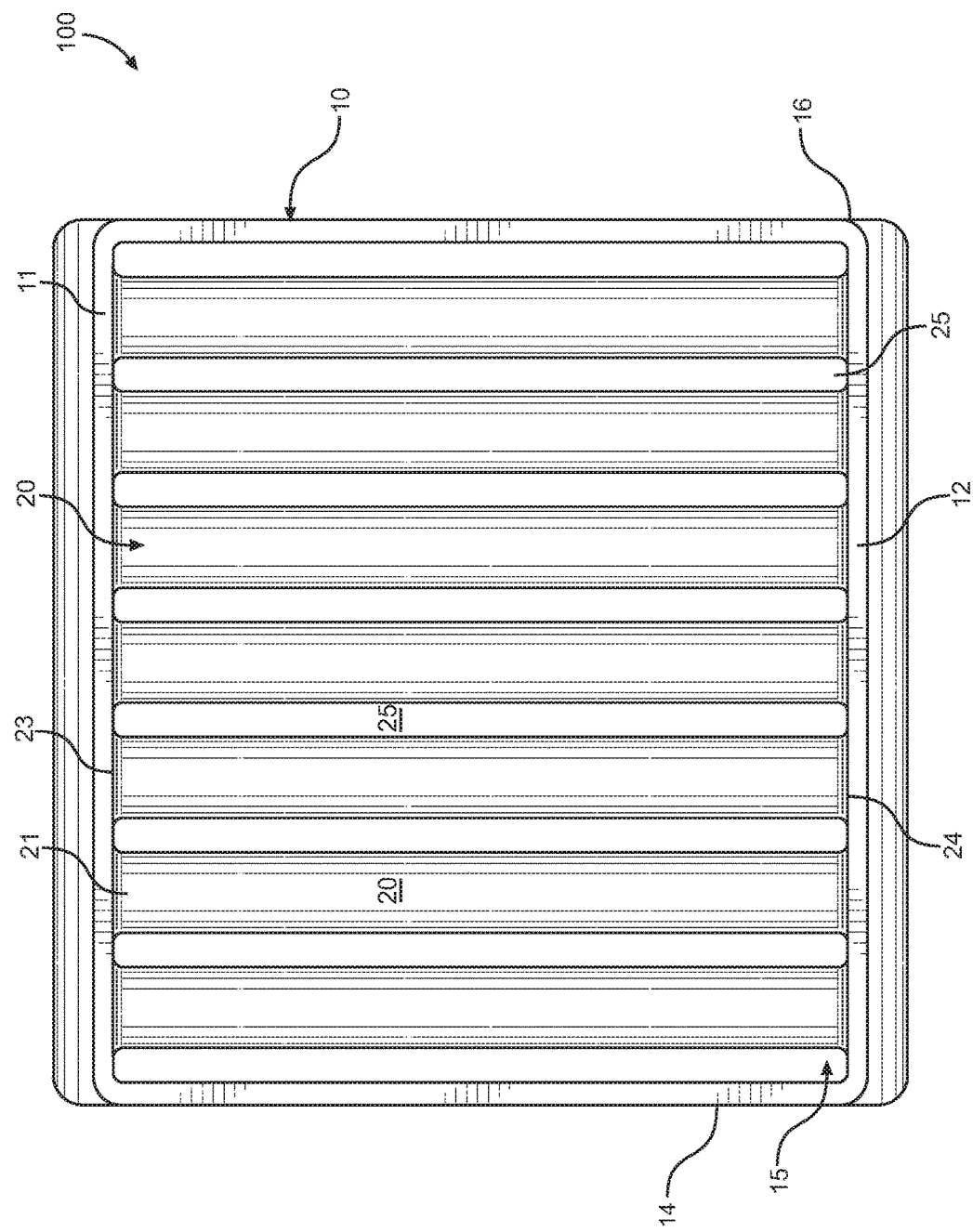
FIG. 3 depicts an aerial view of a preferred embodiment of an egg separating apparatus of the present invention.

FIG. 3 depicts an aerial view of egg separating apparatus 100 comprising support frame member 10 and inner rod members 20. Support member 10 comprises a substantially rectangular-shaped frame, wherein frame further comprises side members 14 that are attachably connected to each other, thereby cooperating to form inner opening 15. When frame is constructed, side members 14 form corners 16 at each connection point, wherein corners 16 beneficially have relatively rounded edges, thus creating a relatively smooth surface throughout egg separating apparatus 100 of the present invention.

In a preferred embodiment, inner rods 20 are located within inner opening 15 of support member 10. Inner rods 20 have a substantially semi-circular configuration with a substantially curved top surface 21, thereby providing a substantially smooth and soft exterior in order to prevent an egg yolk from breaking upon contact with top surface 21. Further, inner rods 20 attachably connect to the present invention from one side 11 of support member 10 to an opposing parallel side 12 of support member 10 and are equidistantly spaced apart, thereby creating passages 25, between each rod 20.

FIG. 4 depicts a side view of egg separating apparatus 100 in operation, wherein a user cracks at least one egg 1 over egg separating apparatus 100. Once a user cracks egg 1 over egg separating apparatus 100, egg yolk 2 and egg white 3 both land on top surface 21 of inner rod members 20 within support member 10. Egg white 3 then separates from egg yolk 2, thereby falling through passages 25 located between inner rod members 20, and ultimately, landing within a bowl 4, or any other similar receiving container, that is positioned underneath egg separating apparatus 100. Simultaneously, egg yolk 2 remains positioned on top surface 21 of inner rod members 20, thus being able to be removed by said user. As a result, egg yolk 2 and egg white 3 are then fully separated, and ultimately, able to be used, as desired.

Although not illustrated in FIG. 4, in an alternate embodiment, a plurality of eggs can be simultaneously cracked over egg separating apparatus 100, wherein a plurality of egg yolks are then able to be separated from a plurality of egg whites at a single time. As a result, egg separating apparatus 100 provides for a more efficient and effective egg separating technique.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An egg separating apparatus comprising:
   a) a substantially square support frame member defining an inner opening;
   b) a plurality of rod members that are attachably connected to said support frame member within said opening, wherein said rod members comprise a substantially semi-circular configuration with a substantially curved and rounded top surface in order to provide a substantially smooth exterior and thus prevent an egg yolk from breaking upon contact with said top surface; and
   c) a plurality of vents that are formed between said rod members, wherein said vents comprise a width distance that is relatively wide enough to allow at least one egg white to pass through said vents, but that is relatively narrow enough to prevent at least one egg yolk from passing through said vents.

2. The egg separating apparatus of claim 1, wherein said rod members have a first end and a second end, and said first end and said second end are each connected to said support frame member.

3. The egg separating apparatus of claim 2, wherein said rod members are equidistantly spaced apart.

* * * * *